(12) United States Patent
Feliss et al.

(10) Patent No.: US 7,345,845 B2
(45) Date of Patent: Mar. 18, 2008

(54) FLUID DAMPING STRUCTURE FOR HARD DISK DRIVES AND VIBRATION SENSITIVE ELECTRONIC DEVICES

(75) Inventors: Norbert A. Feliss, Sunnyvale, CA (US); Karl Arthur Flechsig, Los Gatos, CA (US); Donald Ray Gillis, San Jose, CA (US); Sylvia Lui Lee, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 434 days.

(21) Appl. No.: 10/956,903

(22) Filed: Sep. 30, 2004

(65) Prior Publication Data

US 2006/0075412 A1 Apr. 6, 2006

(51) Int. Cl.
*G11B 33/02* (2006.01)
*G06F 1/16* (2006.01)

(52) U.S. Cl. .................................. 360/97.02
(58) Field of Classification Search ............. 360/97.02, 360/97.01; 720/651, 648; 361/683, 685
See application file for complete search history.

(56) References Cited

U.S. PATENT DOCUMENTS

| | | | | |
|---|---|---|---|---|
| 5,663,943 | A | * | 9/1997 | Yanagisawa et al. ....... 720/651 |
| 5,745,471 | A | * | 4/1998 | Son et al. .................... 720/694 |
| 6,154,360 | A | * | 11/2000 | Kaczeus et al. ............. 361/685 |
| 6,243,228 | B1 | | 6/2001 | Yoshida et al. |
| 6,347,411 | B1 | * | 2/2002 | Darling .......................... 2/272 |
| 6,567,265 | B1 | * | 5/2003 | Yamamura et al. ......... 361/685 |
| 6,583,950 | B2 | | 6/2003 | Yoshida et al. |
| 6,633,481 | B2 | * | 10/2003 | Pavol .......................... 361/685 |
| 6,697,218 | B2 | | 2/2004 | Yoshida et al. |
| 7,009,835 | B2 | * | 3/2006 | Desai et al. ................. 361/683 |
| 7,012,805 | B2 | * | 3/2006 | Shah et al. .................. 361/685 |
| 2002/0030922 | A1 | | 3/2002 | Yoshida et al. |
| 2002/0043608 | A1 | * | 4/2002 | Nakata et al. ............... 248/560 |
| 2002/0097556 | A1 | * | 7/2002 | Lee ............................. 361/685 |
| 2003/0174436 | A1 | | 9/2003 | Yoshida et al. |
| 2004/0037001 | A1 | | 2/2004 | Hanada et al. |
| 2004/0070867 | A1 | | 4/2004 | Kudo et al. |

* cited by examiner

*Primary Examiner*—Brian E Miller
*Assistant Examiner*—Matthew G. Kayrish
(74) *Attorney, Agent, or Firm*—D'Arcy H. Lorimer; Lorimer Labs

(57) ABSTRACT

A shock and vibration resistant hard disk drive has a plurality of fluid damping isolation devices disposed between the drive and a supporting frame. The isolation devices are capsules containing either gasses or liquids enclosed in a flexible membrane. Variation of fluid properties such as density, viscosity, and pressure allow for custom tuning of the vibration and shock performance.

12 Claims, 4 Drawing Sheets

FLUID DAMPING STRUCTURE FOR HARD DISK DRIVES AND VIBRATION SENSITIVE ELECTRONIC DEVICES

BACKGROUND OF THE INVENTION

1. Field of the Invention

The present invention relates to vibration and mechanical shock protection of electronic devices. More specifically, the present invention relates to the fluid damping structures for the protection of hard disk drives and other sensitive electronic devices used in high vibration and shock environments.

2. Description of the Related Art

The increasing popularity and computing performance of portable electronic devices such as cell phones, MP3 players, global positioning units, PDAs and portable computers, coupled with the miniaturization and increased storage density of hard disk drives, has migrated demand for the hard disk drive into these portable devices. However, the hard disk drive was never designed to be used in high vibration or high impact and shock environments. Redesigning the hard drives to meet such requirements would increase costs and reduce demand for many portable, cost sensitive applications such as cell phones and MP3 players. It would be useful to have a packaging system that would isolate currently designed drives from shock and vibration to enable such drives to be used in portable devices.

U.S. Pat. Nos. 6,243,228; 6,583,950; 6,697,218; and Patent Application Publications US 2002/0030922, US 2003/0174436, to Yoshida et al., disclose shock-absorbing materials made from a mixture of solid particles and viscous elastic material is arranged at the periphery of an information storage and retrieval device. When an external shock is applied to the device, the shock-absorbing material is greatly deformed and dissipates the shock energy by inner friction sufficiently to prevent damage to the inner mechanism of the device. The deformed shock-absorbing material can be restored to the original shape so that it is repeatedly usable. However, the shock absorbing material disclosed in the aforementioned references requires that the storage device be manually repositioned to its original position after impact. This is impractical in most potable device applications because users usually do not open their cell phones or MP3 players after they are shocked or dropped, due to the difficulty of opening such miniature devices. Often, the manufacturer discourages such action by voiding warranties. The shock absorbing materials are complex solids containing a wide variety of components including sand, springs, complex webs, and cloth contained within a solid viscous elastic material. These materials may be expensive to manufacture, increasing the potential cost of the hard drives and reducing the desirability for their use in mass produced portable applications. Additionally, it is unclear as to whether the disclosed structures are effective for isolating vibration which may be just as destructive to the hard drive if present over prolonged period of time.

US Patent Application Publication 2004/0070867 discloses cushioning devices placed at the four corners of the hard disk drive to suspend the drive within an external frame. The cushioning devices are composed of various types or rubber or solid viscous elastic material such as silicone gels. However, the area supported by the cushioning devices is limited, which may create compromises between shock protection and vibration isolation. That is, to protect effectively against shock loads with cushioning devices having a small contact area, requires stiffer material that may transmit more vibration.

What is needed is a low cost, simple method to effectively provide shock and vibration protection to hard disk drives and other sensitive electronic devices.

SUMMARY OF THE INVENTION

It is an object of the present invention to provide a shock resistant information storage and retrieval device containing a hard disk drive, a frame enclosing the hard disk drive, and a plurality of isolation devices disposed between at least one inner surface of the frame and at least one opposing outer surface of the hard disk drive, wherein the isolation devices comprise a fluid contained within a flexible membrane.

It is another object of the present invention to provide a shock resistant information storage and retrieval device containing a hard disk drive having a top surface, a bottom surface, a front surface, a rear surface, a left surface, and a right surface. A frame enclosing the hard disk drive has a top inner surface opposing the top surface, a bottom inner surface opposing the bottom surface, a left inner surface opposing the left surface, a right inner surface opposing the right surface, a front inner surface opposing the front surface, and a rear inner surface opposing the rear surface. A first isolation device is disposed between the top inner surface and the top surface, wherein the first isolation device comprises a first fluid contained within a first flexible membrane. A second isolation device is disposed between the bottom inner surface and the bottom surface, wherein the second isolation device comprises a second fluid contained within a second flexible membrane. A third isolation device is disposed between the left inner surface and the left surface, wherein the third isolation device comprises a third fluid contained within a third flexible membrane. A fourth isolation device is disposed between the right inner surface and right top surface, wherein the fourth isolation device comprises a fourth fluid contained within a fourth flexible membrane. A fifth isolation device is disposed between the front inner surface and the front surface, wherein the fifth isolation device comprises a fifth fluid contained within a fifth flexible membrane, and a sixth isolation device is disposed between the rear inner surface and the rear surface, wherein the sixth isolation device comprises a sixth fluid contained within a sixth flexible membrane.

BRIEF DESCRIPTION OF THE DRAWINGS

The present invention will be better understood when consideration is given to the following detailed description thereof. Such description makes reference to the annexed drawings, wherein.

DETAILED DESCRIPTION OF THE PREFERRED EMBODIMENTS

Figure 1:
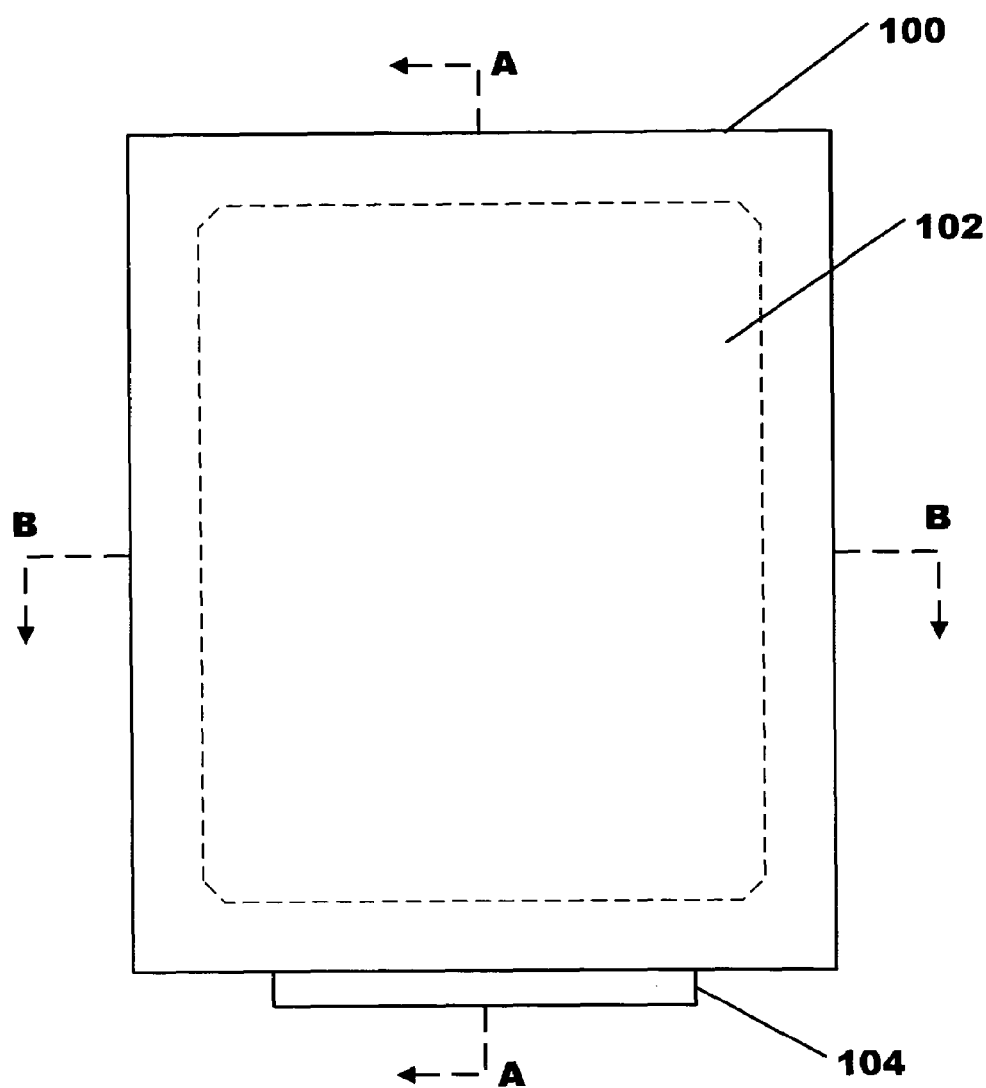
FIG. 1 is a top view of a shock and vibration isolation frame according to an embodiment of the present invention.

FIG. 1 is a top view of a shock and vibration isolation frame 100 according to an embodiment of the present invention. Contained within the frame 100 is a packaged electronic device 102 for which shock and vibration isolation is desired. Electrical connections with device 102 are made through connector 104. Device 102 can be any electronic device, but is preferably a device containing moving or rotating parts such as hard disk drives, CD players, or DVD players, for example. Predominately, the invention is applied to protect hard disk drives, but as any practitioner skilled in the art will appreciate, other devices such as those mentioned are equally suitable. Frame 100 is a rigid structure that completely encompasses hard drive device 102, and provides for interconnectivity with outside circuit devices via connector 104. For simplicity, frame 100 is shown as a single component, but it may also be composed of sections that are fastened together using methods well known to those skilled in the art. Cross section views though sections A-A and B-B are presented in FIGS. 3 and 4 below.

Figure 2:
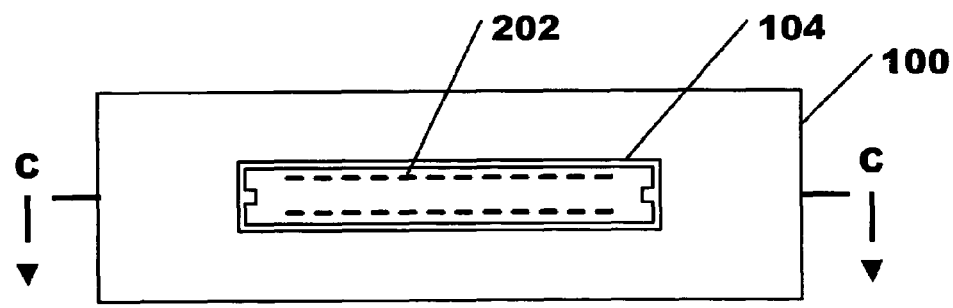
FIG. 2 is a front end view of a shock and vibration isolation frame according to an embodiment of the present invention.

FIG. 2 is a front end view of a shock and vibration isolation frame 100 according to an embodiment of the present invention. Connector 104 contains circuit pins 202 for making the desired electrical connections. The number, spacing, and layout of the connector 104 and pins 202 is usually standardized and is well known to those skilled in the art. Cross section view through section C-C is presented in FIG. 5 below.

Figure 3:
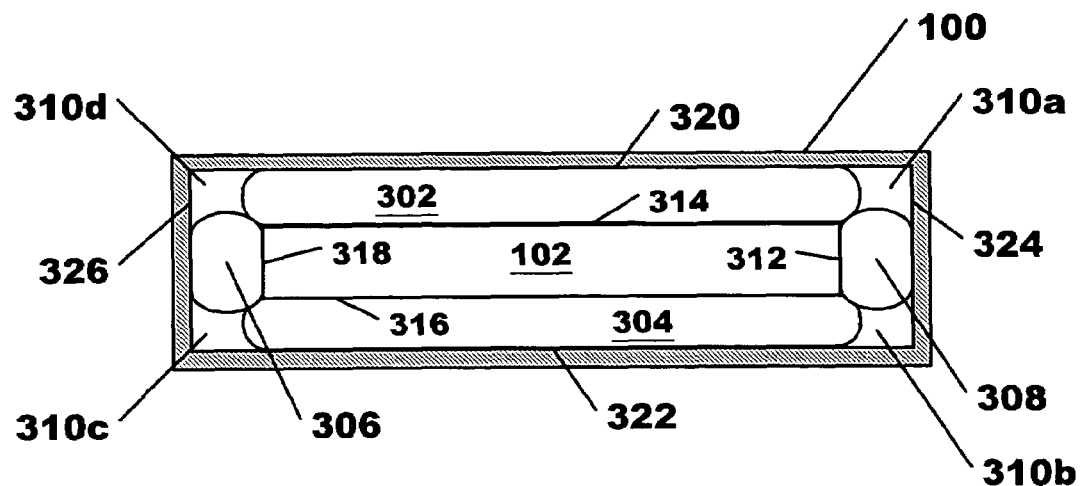
FIG. 3 is a cross section view through section B-B of FIG. 1 according to an embodiment of the present invention.

FIG. 3 is a cross section view through section B-B of FIG. 1 according to an embodiment of the present invention. This and following figures illustrate the vibration and shock isolation frame 100 as applied to hard disk drives. Minor variations in the layout and design of frame 100 would be required for removable media devices such as CD-ROMs or DVD players to allow media access, as can be appreciated by those skilled in the art. Hard disk drive 102 is suspended within the interior of frame 100 by isolation devices 302, 304, 306 and 308. Frame 100 may be, for example, a box or structure which is generally rigid and encloses a volume sufficient to contain hard disk drive 102 and the isolation devices. Frame 100 is preferably made of metal, but may also be constructed of rigid plastics of sufficient impact resistance. Isolation devices 302 and 304 are in contact with and cover the majority of top and bottom surfaces 314 and 316 of hard drive 102, respectively. Isolation device 302 is also in contact with top, inner surface 320 of frame 100. Isolation device 304 is also in contact with bottom, inner surface 322 of frame 100. Isolation devices 308 and 306 are in contact with left and right side surfaces 318 and 312 of hard disk drive 102, respectively. Isolation device 306 is also in contact with right, inner surface 326 of frame 100. Isolation device 308 is also in contact with left, inner surface 324 of frame 100. Isolation devices 302-308 are, for example, fluid filled balloons or capsules. A thin, elastic membrane or film contains the fluid. As used in this specification, a fluid can be a liquid or gas. It is to be distinguished from a viscous elastic gel of the prior art in that the viscous elastic gels are solids. These gel solids retain their shape without the need of a confining container. Fluids are more desirable than viscous gels because fluid properties such as density and viscosity can be varied over 5 orders of magnitude, allowing tuning of the system to match anticipated vibration and shock environments. Liquids may be more suitable than gasses for hard drives that generate a lot of heat that must be dissipated. Gasses may be more suitable than liquids for cold environments that require heat be retained within the drive for proper operation. Areas 310a-d are desired to accommodate possible expansion of the isolation devices 302-308, which may occur under compressive loads created by the movement of device 102 in response to a shock force. For isolation devices containing a gas, areas 310a-d can be minimized or eliminated due to the compressibility of a gas. However, if the isolation devices contain a liquid, expansion areas 310 are desirable to maximize the deflection of the disk drive 102 under a shock load. Optionally, isolation devices 302-308 may be glued or attached to corresponding surfaces of frame 100, hard drive 102, or both. This may be desirable for isolation devices containing liquids, to increase the damping factor. When the hard disk drive is vibrated or shocked the liquid or air filled isolation devices 302-308 return to their original shape after the shock event has passed. There is no need for manual intervention to re-deploy the membranes to their original shapes. An important attribute of the present invention provides a shock attenuating environment for the hard disk drive where the shape of the isolation devices is not substantially changed subsequent to the shock event. The shape of the devices will look the same before and after the shock or vibration event has transpired.

Figure 4:
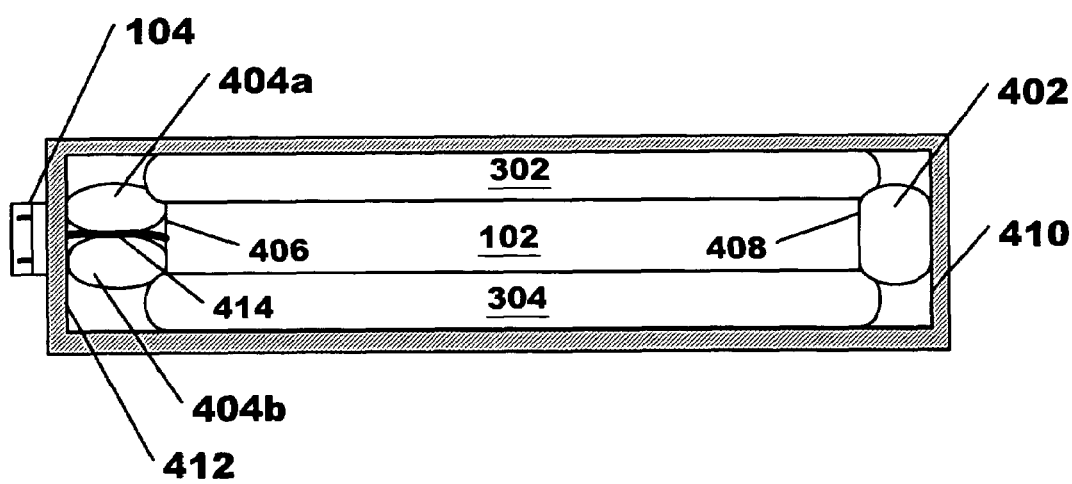
FIG. 4 is a cross section view through section A-A of FIG. 1 according to an embodiment of the present invention.

FIG. 4 is across section view through section A-A of FIG. 1 according to an embodiment of the present invention. Isolation devices 402 and 404 are in contact with rear and front surfaces 408 and 406 of hard disk drive 102, respectively. Isolation device 402 is also in contact with rear, inner surface 410 of frame 100. Isolation devices 410a,b are also in contact with front, inner surface 412 of frame 100. Two parallel isolation devices 410a and 410b are shown to facilitate the positioning of ribbon cable 414 from disk drive 102 to connector 104. However, a single isolation device 410 (not shown) could also be used, wherein cable 414 is routed between isolation device 302 or 304 and device 404.

Figure 5:
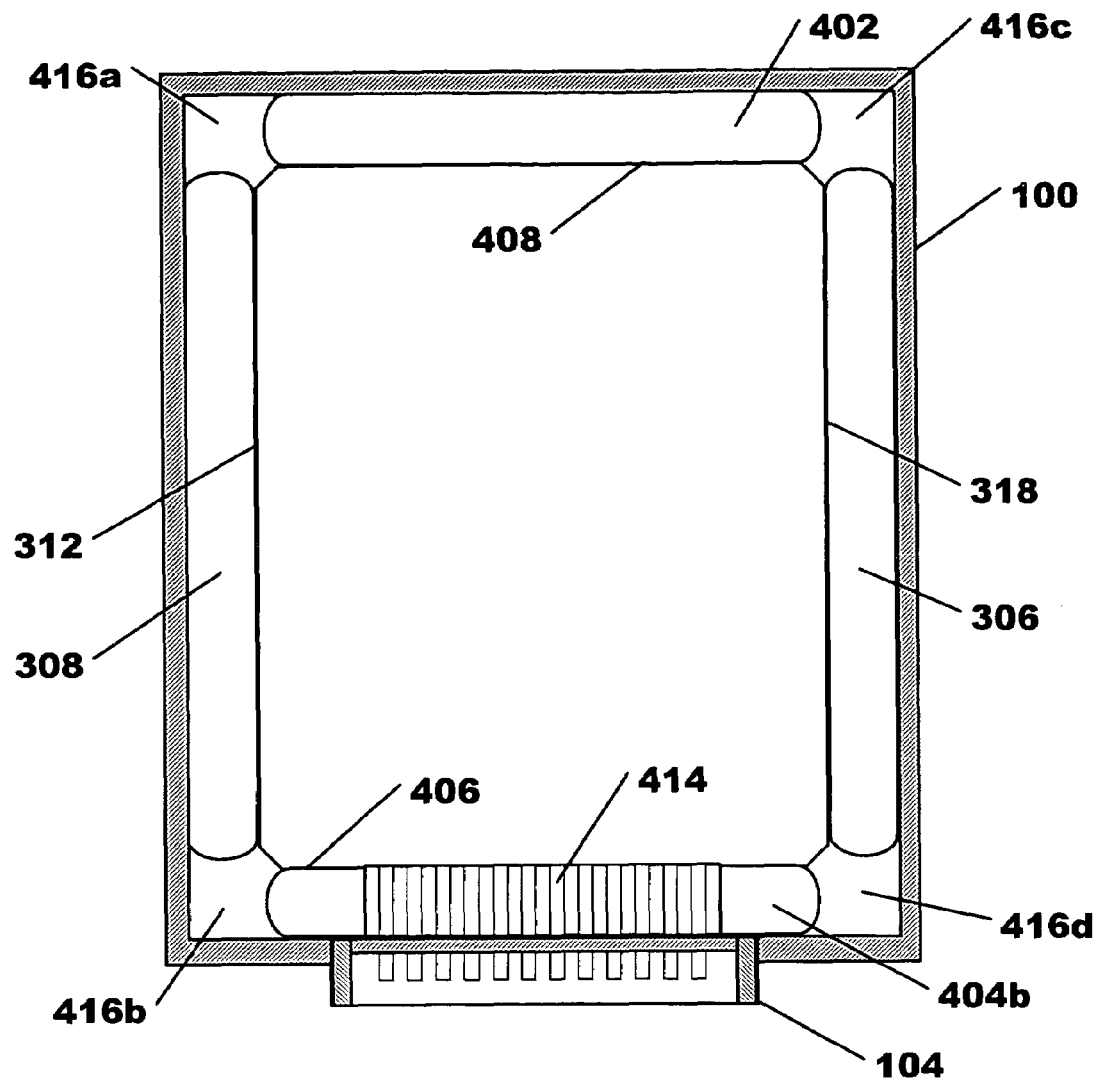
FIG. 5 is a cross section view through section C-C of FIG. 2 according to an embodiment of the present invention.

FIG. 5 is a cross section view through section C-C of FIG. 2 according to an embodiment of the present invention. Isolation devices 306, 308, 402, and 404b extend approximately the full length or width of hard drive 102. Areas 416a-d may be provided to accommodate compression of liquid filled isolation devices, as described above.

Figure 6:
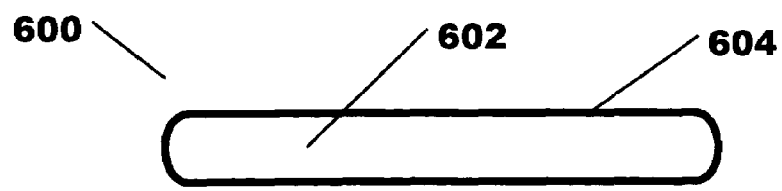
FIG. 6 is a cross section view of a fluid filled isolation device according to an embodiment of the present invention.

FIG. 6 is a cross section view of a fluid filled isolation device 600 according to an embodiment of the present invention. Isolation device 600 comprises a flexible membrane 604 that serves as containment for fluid 602, which can be a liquid or a gas. The flexible membrane 604 provides a "spring" component to the system. The fluid provides a damping component to the system. For gasses, an additional spring component is added due to compressibility. An advantage of the present invention is the tune-ability that this embodiment provides.

Fluid density and fluid viscosity have a substantial effect on the dynamic vibration and impact response of isolation device 600. Fluid density can be varied over about three orders of magnitude from gasses to liquids. Liquids having a density from about 0.5 g/cc to about 2 g/cc are preferable. More preferably, hydrocarbon, fluorocarbon, an silicone based fluids are suitable. Gasses having pressures from about 1 to 2 atm. (absolute) at 25° C. are also preferable.

Viscosity can be varied over 6 orders of magnitude. Liquids having viscosities from about 0.5 centipoise to about 10,000 centipoise are suitable. Gasses having viscosities between 0.05 and 0.005 centipoise are also suitable.

The elasticity of the membrane and the pressure of the fluid inside the membrane also have an effect on the vibration and shock isolation characteristics of the isolation device 600. By varying film thickness and material composition of the film, the spring constant of the system can be varied. Flexible membrane 604 can be made from natural or synthetic rubbers, silicone rubber, and polyethylene. Preferably, the membrane 604 is made from polyethylene. The membrane thickness can vary from about 1 mil (0.001") to about 30 mils, and is preferably 1 to 10 mils for polyethylene films. Pressures of the fluid contained within the membrane are between about 1 to 2 atm. (absolute), preferably between about 1 and 1.2 atm. (absolute).

A further advantage of the present invention provides for the custom tuning of individual isolation devices or opposing device pairs to optimize shock or vibration response along different geometric dimensions or axes. For example, isolation devices 302 and 304 may contain fluids of different properties than devices 306, 308, 402, and 404*a,b* to compensate for the different contact areas. Additionally, individual isolation devices may be constructed of membranes of different thickness or elasticity for the same reason.

Figure 7:
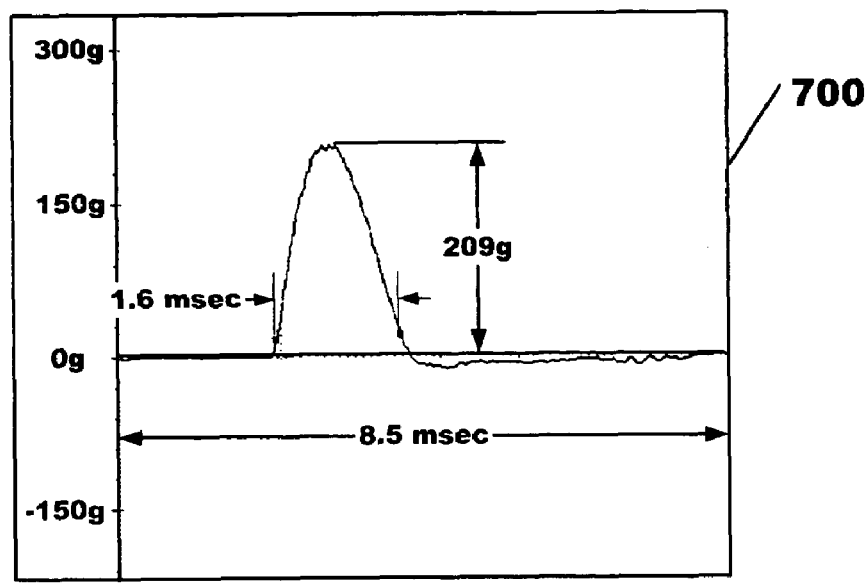
FIG. 7 is a graph of force versus time for a shock load applied to the external surface of frame 100 according to an embodiment of the present invention; and, FIG. 8 is a graph of the resulting force transmitted to the hard disk drive 102 suspended within the isolation structure according to an embodiment of the present invention.
Figure 8:
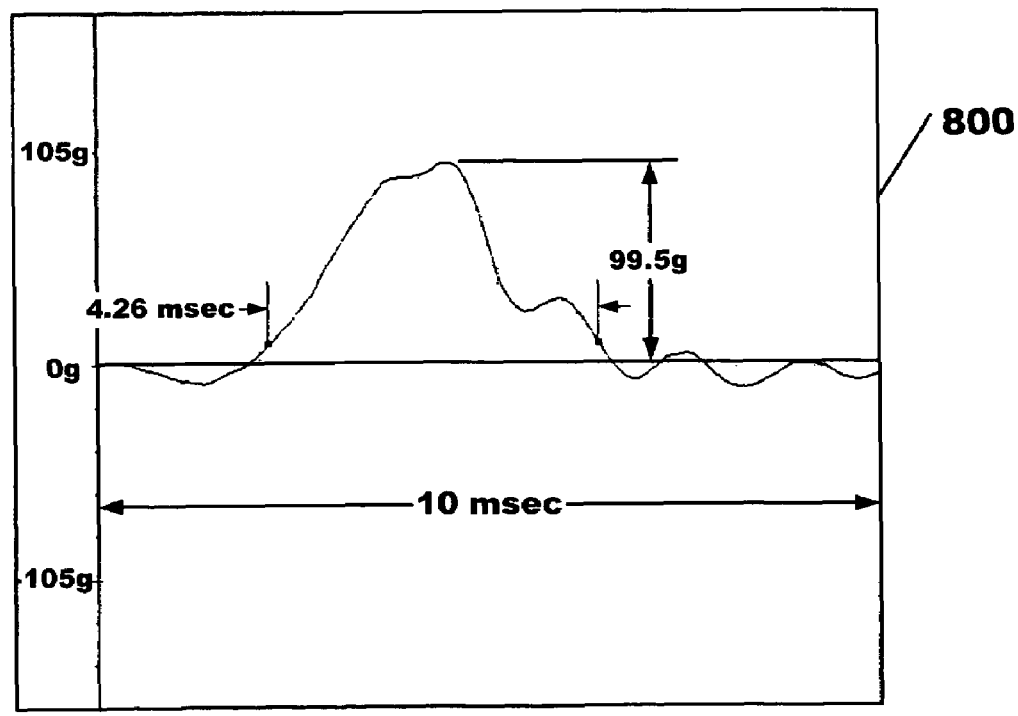

For example, the damping response of the present invention to a shock load is shown in FIGS. 7 and 8. Six gas filled isolation devices were used, each containing air about 1 atm. (absolute), being constructed of polyethylene films of about 5 mils thick. FIG. 7 is a graph 700 of force versus time for a shock load applied to the external surface of frame 100 according to an embodiment of the present invention. A shock force of 209 g (peak) over a time period of 1.6 msec was delivered to the frame containing the hard drive and shock isolation devices. FIG. 8 is a graph 800 of the resulting force transmitted to the hard disk drive 102 suspended within the isolation structure according to an embodiment of the present invention. The shock force delivered to the hard drive has been reduced to 99.5 g (peak) over an extended time period of 4.26 msec.

The present invention is not limited by the previous embodiments heretofore described. Rather, the scope of the present invention is to be defined by these descriptions taken together with the attached claims and their equivalents.

The invention claimed is:

1. A shock resistant information storage and retrieval device comprising:
   a hard disk drive having a top surface, a bottom surface, a front surface, a rear surface, a left surface, and a right surface;
   a frame enclosing said hard disk drive having a top inner surface opposing said top surface, a bottom inner surface opposing said bottom surface, a left inner surface opposing said left surface, a right inner surface opposing said right surface, a front inner surface opposing said front surface, and a rear inner surface opposing said rear surface;
   a first isolation device disposed between said top inner surface and said top surface, wherein said first isolation device comprises a first liquid having a first viscosity, contained within a first flexible membrane;
   a second isolation device disposed between said bottom inner surface and said bottom surface, wherein said second isolation device comprises a second liquid having said first viscosity, contained within a second flexible membrane;
   a third isolation device disposed between said left inner surface and said left surface, wherein said third isolation device comprises a third liquid having a second viscosity, contained within a third flexible membrane;
   a fourth isolation device disposed between said right inner surface and right top surface, wherein said fourth isolation device comprises a fourth liquid having said second viscosity, contained within a fourth flexible membrane;
   a fifth isolation device disposed between said front inner surface and said front surface, wherein said fifth isolation device comprises a fifth liquid having said second viscosity, contained within a fifth flexible membrane; and,
   a sixth isolation device disposed between said rear inner surface and said rear surface, wherein said sixth isolation device comprises a sixth liquid having said second viscosity, contained within a sixth flexible membrane,
   said second viscosity being greater than said first viscosity,
   said first viscosity and said second viscosity being between about 0.5 and 10,000 centipoise.

2. The device as recited in claim 1, wherein said first flexible membrane, said second flexible membrane, said third flexible membrane, said fourth flexible membrane, said fifth flexible membrane, and said sixth flexible membrane are made from polyethylene.

3. The device as recited in claim 2, wherein
   said first and said second flexible membranes are a first thickness, and
   said third, fourth, fifth, and sixth flexible membranes are a second thickness.

4. The device as recited in claim 2 wherein said first, said second, said third, said fourth, said fifth, and said sixth flexible membranes are between 1 and 10 mils thick.

5. The device as recited in claim 1, wherein said first flexible membrane, said second flexible membrane, said third flexible membrane, said fourth flexible membrane, said fifth flexible membrane, and said sixth flexible membrane are made from rubber.

6. A shock resistant information storage and retrieval device comprising:
   a hard disk drive having a top surface, a bottom surface, a front surface, a rear surface, a left surface, and a right surface;
   a frame enclosing said hard disk drive having a top inner surface opposing said top surface, a bottom inner surface opposing said bottom surface, a left inner surface opposing said left surface, a right inner surface opposing said right surface, a front inner surface opposing said front surface, and a rear inner surface opposing said rear surface;
   a first isolation device disposed between said top inner surface and said top surface, wherein said first isolation device comprises a first gas pressurized to a first pressure, contained within a first flexible membrane;
   a second isolation device disposed between said bottom inner surface and said bottom surface, wherein said second isolation device comprises a second gas pressurized to said first pressure, contained within a second flexible membrane;
   a third isolation device disposed between said left inner surface and said left surface, wherein said third isolation device comprises a third gas pressurized to a second pressure, contained within a third flexible membrane;

a fourth isolation device disposed between said right inner surface and right top surface, wherein said fourth isolation device comprises a fourth gas pressurized to said second pressure, contained within a fourth flexible membrane;

a fifth isolation device disposed between said front inner surface and said front surface, wherein said fifth isolation device comprises a fifth gas pressurized to said second pressure, contained within a fifth flexible membrane; and a sixth isolation device disposed between said rear inner surface and said rear surface, wherein said sixth isolation device comprises a sixth gas pressurized to said second pressure, contained within a sixth flexible membrane.

7. The device as recited in claim 6 wherein said second pressure is greater than said first pressure.

8. The device as recited in claim 7 wherein said first pressure and said second pressure are between about 1 and 1.2 atm. absolute.

9. The device as recited in claim 6, wherein said first flexible membrane, said second flexible membrane, said third flexible membrane, said fourth flexible membrane, said fifth flexible membrane, and said sixth flexible membrane are made from polyethylene.

10. The device as recited in claim 9, wherein
said first and said second flexible membranes are a first thickness, and
said third, fourth, fifth, and sixth flexible membranes are a second thickness.

11. The device as recited in claim 9 wherein said first, said second, said third, said fourth, said fifth, and said sixth flexible membranes are between 1 and 10 mils thick.

12. The device as recited in claim 6, wherein said first flexible membrane, said second flexible membrane, said third flexible membrane, said fourth flexible membrane, said fifth flexible membrane, and said sixth flexible membrane are made from rubber.

* * * * *